United States Patent [19]
Johnston et al.

[11] Patent Number: 5,423,380
[45] Date of Patent: Jun. 13, 1995

[54] PROCESS FOR TREATING OIL-BEARING FORMATION

[75] Inventors: Everett L. Johnston; Ahmad Moradi-Araghi; Karen H. Carney, all of Bartlesville, Okla.

[73] Assignee: Phillips Petroleum Company, Bartlesville, Okla.

[21] Appl. No.: 200,083

[22] Filed: Feb. 22, 1994

[51] Int. Cl.⁶ .......................................... E21B 33/138
[52] U.S. Cl. ...................................... 166/295; 166/294; 166/300
[58] Field of Search ............... 166/270, 294, 295, 300, 166/308

[56] References Cited

U.S. PATENT DOCUMENTS

| | | | |
|---|---|---|---|
| 3,599,717 | 8/1971 | McMillen | 166/273 |
| 3,727,688 | 4/1973 | Clampitt | 166/283 |
| 3,749,172 | 7/1973 | Hessert et al. | 166/274 |
| 3,762,476 | 10/1973 | Gall | 166/294 |
| 4,034,810 | 7/1977 | Holloway | 166/274 |
| 4,068,714 | 1/1978 | Hessert et al. | 166/246 |
| 4,679,625 | 7/1987 | Gibbons | 166/270 |
| 4,706,754 | 11/1987 | Smith | 166/295 |
| 4,838,352 | 6/1989 | Oberste-Padtberg et al. | 166/295 X |
| 4,846,276 | 7/1989 | Haines | 166/273 |
| 4,848,466 | 7/1989 | Lin | 166/273 |
| 4,856,589 | 8/1989 | Kuhlman et al. | 166/273 |
| 5,002,127 | 3/1991 | Dalrymole et al. | 166/295 |
| 5,003,006 | 3/1991 | Chu et al. | 525/92 |
| 5,018,578 | 5/1991 | Rabaa et al. | 166/300 X |
| 5,071,890 | 12/1991 | Shu et al. | 523/130 |
| 5,076,362 | 12/1991 | Beardmore | 166/270 X |

Primary Examiner—George A. Suchfield
Attorney, Agent, or Firm—Lucas K. Shay

[57] ABSTRACT

A process for treating a subterranean formation comprises adding a crosslinking agent intermittently to a stream of gellable polymer wherein the gellable polymer forms a gel in the formation, in the presence of the crosslinking agent.

21 Claims, 3 Drawing Sheets

PROCESS FOR TREATING OIL-BEARING FORMATION

FIELD OF THE INVENTION

The present invention relates to a process for altering permeability of oil-bearing subterranean formations in oil field operations.

BACKGROUND OF THE INVENTION

It is well known to those skilled in the art that gelled or crosslinked water-soluble polymers are useful in enhanced oil recovery and other oil field operations. They have been used to alter the permeability of underground formations in order to enhance the effectiveness of water flooding operations. Generally, polymers along with an appropriate crosslinking system are injected in an aqueous solution into the formation. The polymers then permeate into and gel in the regions having the highest water permeability.

Because of environmental concerns as well as cost for disposing of a produced brine which is defined as the brine co-produced with oil and gas, it is desirable to utilize the produced brine as the aqueous solution used for the polymers and appropriate crosslinking systems. Use of produced brines eliminates not only the cost associated with acquiring and pre-treating fresh water for use as the aqueous solution but also the disposal cost for the produced brine. Most produced brines are known to be hard brines, i.e., those having a divalent cation concentration greater than 1000 ppm. Chromium(III) carboxylates such as, for example, chromium acetate or chromium propionate, are the only known crosslinkers which can be used to produce stable gels in produced brines for near-wellbore treatment. See for example R. D. Sydansk, *Acrylamide-Polymer/Chromium(III)-Carboxylate Gels for Near Wellbore Matrix Treatments*, Proceedings SPE/DOE Seventh Symposium on Enhanced Oil Recovery (1990). Although a chromium(III) salt is not as toxic as a chromium(VI) salt, it is not an environmentally desirable compound and its use may require additional costs to assure the integrity of the injection wells to avoid contamination of ground water sources.

Therefore, a more environmentally suitable gelling composition that can form stable gels in produced brines for near-wellbore as well as in-depth treatments has been developed. However, the crosslinking agents are not inexpensive. In order to reduce cost in enhanced oil recovery, a process for reducing the permeability of oil-bearing formation by reducing the total quantity of crosslinking agents is highly desirable.

SUMMARY OF THE INVENTION

An object of the invention is to provide a process for altering the permeability of oil-bearing formations. Another object of the invention is to provide a process for altering the permeability of oil-bearing formations by using a gelling composition that is environmentally suitable for use in oil field operations. A further object of the invention is to provide a process for altering the permeability of oil-bearing formation with reduced amount of a gelling composition. Still another object of the invention is to provide a process for wellbore treatment employing a gelling composition that is environmentally suitable for oil field operations. An advantage of the invention is the invention process employs less crosslinking agents, yet achieves the alteration of permeability of the formations. Other objects, features, and advantages will become more apparent as the invention is more fully disclosed hereinbelow.

According to the present invention, a process for treating an oil-bearing formation is provided which comprises adding a crosslinking agent intermittently to a stream of aqueous solution of a gellable polymer wherein the gellable polymer forms gels in the presence of the crosslinking agent when injected into a subterranean formation.

DETAILED DESCRIPTION OF THE INVENTION

Figure 1:
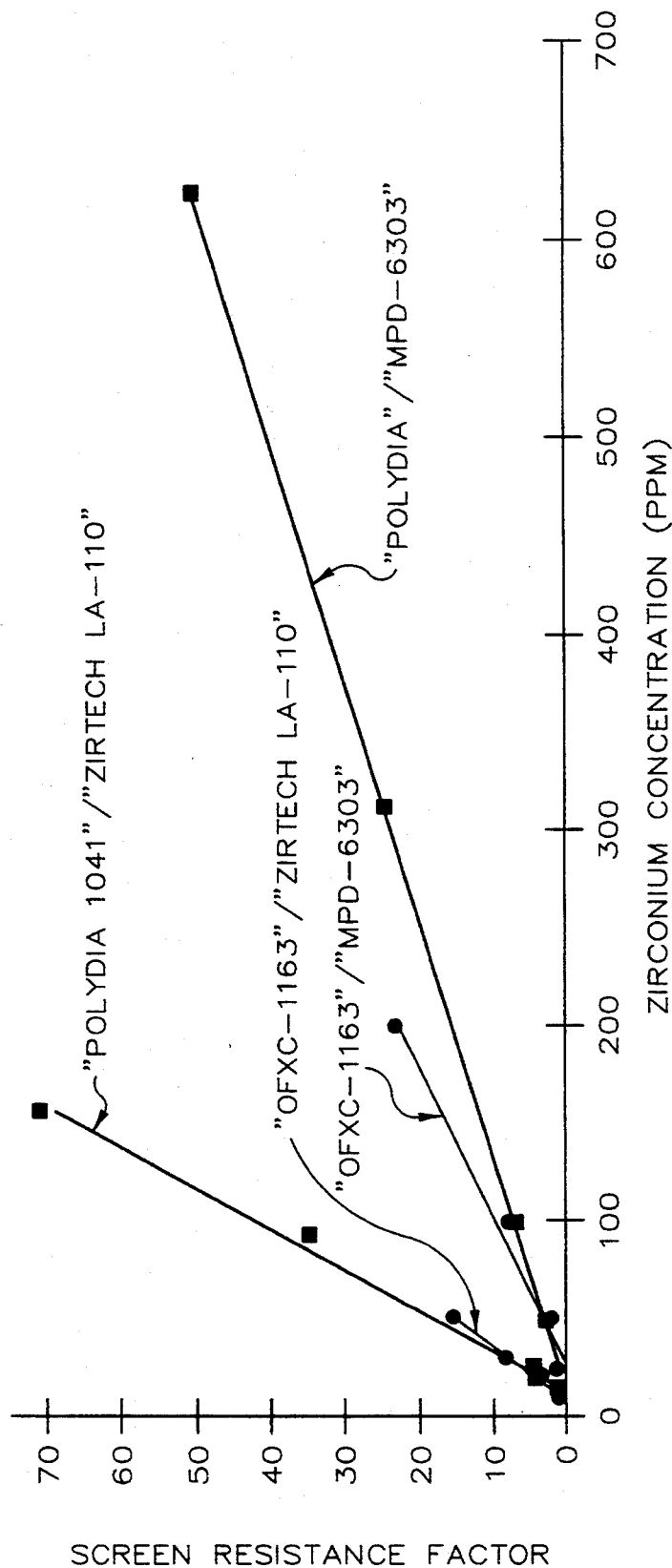
FIG. 1 is the measurement of screen resistance factor (SRF) for several gelling mixtures comprising polymers and crosslinking agents as shown. "POLYDIA 1041" is a polyacrylamide (POLYDIA 1041 commercially available from Nitto Chemical Industry Co. Ltd., Tokyo, Japan) having 3-6% hydrolysis and "OFXC-1163" is a polyacrylamide (commercially available from American Cyanamid) having 8% hydrolysis and a molecular weight of 14,000,000-18,000,000. "ZIRTECH LA-110" is zirconium lactate (commercially available from BenchMark Research and Technology, Inc.) and "MPD-6303" is a zirconium complex (available from DuPont).

According to the present invention, a process is provided for treating an oil-bearing formation which comprises adding a crosslinking agent intermittently to a stream of a gellable polymer which is being injected into a well. Generally the gellable polymer is a water soluble polymer and is present in an aqueous solution containing water. The term "water" used herein generically refers to, unless otherwise indicated, pure water, regular tap water, a solution or suspension wherein the solution or suspension contain a variety of salts. A typical solution is a produced brine. The treatment includes, but is not limited to, water shutoff, gas shutoff, and zone abandonment.

The produced brine is defined as the brine co-produced with oil or gas, or both, which generally is a hard brine, i.e., containing at least 1,000 ppm of $Ca^{+2}$, $Ba^{+2}$, $Mg^{+2}$, or $Sr^{+2}$, or combinations thereof. Produced brine generally contains high salinity of from about 1 weight % to about 30% total dissolved solids. The gellable polymer generally gels well in produced brines having a salinity of from about 0.3% to about 27%.

Polymers suitable for use in this invention are those capable of gelling in the presence of a crosslinking agent. Polymers suitable for use in this invention, i.e., those capable of gelling in the presence of crosslinking agents within a gelation pH range, include biopolysaccharides, cellulose ethers, and acrylamide-based polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC) for their ready availability.

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradename "KELZAN" (Kelco Company, Los Angeles, Calif. and "FLOCON 4800" (Pfizer, Groton, Conn.) and they are readily available.

Suitable acrylamide-containing polymers which also contain small amounts of pendant carboxylate (acrylate) groups are disclosed in U.S. Pat. No. 3,749,172 (herein incorporated by reference). As used herein, the term "small amounts" refers to about 0.5 to 10 mole percent. Particularly preferred are the so-called partially hydrolyzed polyacrylamides possessing pendant carboxylate groups through which metallic crosslinking can take place. Thermally stable polymers of acrylamide, such as copolymers of N-vinyl-2-pyrrolidone and acrylamide, terpolymers of sodium-2-acrylamido-2-methylpropanesulfonate, acrylamide and N-vinyl-2-pyrrolidone, and copolymers of sodium-2-acrylamido-2-methylpropanesulfonate and acrylamide, are particularly preferred for applications in high salinity environments at elevated temperatures for stability. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups. Generally, the polymers contain some carboxylate group if the polymers are used to crosslink with multivalent cations such as Zr, Ti, Cr, and Al cations. In the absence of the carboxylate group, the polymers can be used to crosslink with organic crosslinkers such as, for example, phenol and formaldehyde, or precursors thereof, or furfuryl alcohol and formaldehyde, or an aminobenzoic acid and formaldehyde. Precursors of formaldehyde such as, for example, hexamethylenetetramine can be, and are more preferably, used in place of formaldehyde.

Other miscellaneous polymers suitable for use in the present invention include partially hydrolyzed polyacrylonitrile, polystyrene sulfonate, lignosulfonates, or methylolated polyacrylamides, or mixtures thereof.

Presently preferred are CMC, xanthan gum, and the acrylamide-containing polymers, particularly the partially hydrolyzed polyacrylamides, polymers containing acrylamide, ammonium or alkali salt of acrylic acid, and polymers containing ammonium or alkali salt of acrylic acid, N-vinyl-2-pyrrolidone, and sodium-2-acrylamido-2-methylpropanesulfonate.

Any crosslinking agent that is capable of crosslinking the gellable polymer in the oil-bearing formations can be used in the process of the present invention. Examples of suitable crosslinking agents include, but are not limited to, phenol and formaldehyde; resorcinol and formaldehyde; furfuryl alcohol and formaldehyde; phenol and hexamethylenetetramine; p-aminobenzoic acid and hexamethylenetetramine; salicylic acid and hexamethylenetetramine; phenyl salicylate and hexamethylenetetramine; methyl p-hydroxybenzoate and hexamethylenetetramine; phenyl acetate and hexamethylenetetramine; phenyl benzoate and hexamethylenetetramine; phenyl propionate and hexamethylenetetramine; phenyl butyrate and hexamethylenetetramine; aspirin and hexamethylenetetramine; multivalent cation compounds; and combinations of two or more thereof.

The preferred crosslinking agent of the present invention is a multivalent metal compound selected from the group consisting of a complexed zirconium compound, a complexed titanium compound, and mixtures thereof. Examples of suitable crosslinker include, but are not limited to, zirconium citrate, zirconium complex of hydroxyethyl glycine, ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, and combinations thereof. The presently most preferred crosslinking agent is zirconium lactate, zirconium citrate, tetrakis(triethanolamine)zirconate, or zirconium complex of hydroxyethyl glycine, or combinations thereof. These compounds are commercially available.

According to the present invention, the crosslinking agent can also contain a complexing ligand to delay the rate of gelation. The complexing ligand useful for the present invention to retard the rate of gelation is generally a carboxylic acid containing one or more hydroxyl groups and salts thereof. The complexing ligand can also be an amine that has more than one functional group and contains one or more hydroxyl groups and that can chelate the zirconium or titanium moiety of the zirconium or titanium compounds described above. Examples of suitable complexing ligands include, but are not limited to, hydroxyethyl glycine, lactic acid, ammonium lactate, sodium lactate, potassium lactate, citric acid, ammonium, potassium or sodium citrate, isocitric acid, ammonium, potassium or sodium isocitrate, malic acid, ammonium, potassium or sodium malate, tartaric acid, ammonium, potassium or sodium tartrate, triethanolamine, malonic acid, ammonium, potassium or sodium malonate, and mixtures thereof. The presently preferred complexing ligands are citric acid, lactic acid, tartaric acid and salts thereof, and triethanolamine because of their ready availability and low cost.

The concentration or amount of the water-soluble polymer in the aqueous solution can range widely and be as suitable and convenient for the various polymers, and for the degree of gelation needed for particular reservoirs. Generally, the concentration of polymer in an aqueous solution is made up to a convenient strength of about 100 to 20,000 mg/l (ppm), preferably about 200 to 7,000 ppm.

Any suitable procedures for preparing the aqueous admixtures of the gellable polymer can be used. Some of the polymers can require particular mixing conditions, such as slow addition of finely powdered polymer into a vortex of stirred brine, alcohol prewetting, protection from air (oxygen), preparation of stock solutions from fresh rather than salt water, as is known for such polymers.

The concentration of crosslinking agent used in the present invention depends largely on the concentrations of polymer in the composition. Lower concentrations of polymer, e.g., require lower concentrations of the crosslinking agent. Further, it has been found that for a given concentration of polymer, increasing the concentration of crosslinking agent generally substantially increases the rate of gelation. The concentration of crosslinking agent in the injected slug varies generally over the broad range of 1 mg/l (ppm) to 5,000 ppm, preferably over the range of 1 ppm to 1,000 ppm based on Zr or Ti concentration.

The concentration of the complexing ligand in the composition also depends on the concentrations of the water-soluble polymer in the composition and on the desired rate of gelation. Generally, the lower the concentration of the complexing ligand is, the faster the gelation rate is.

The use of gelled polymers to alter the water permeability of underground formations is well known to those skilled in the art. Generally, an aqueous solution containing the polymer and a crosslinker is pumped into the formation so that the solution can enter into the more water swept portions of the formation and alter water permeability by gelling therein.

According to the process of the present invention, an aqueous gellable composition comprising a crosslinking agent and a gellable polymer is injected into an injection or production well. The definition and scope of the crosslinking agent and polymer are the same as those described above. The amount of the aqueous gellable composition injected can vary widely depending on the final gel strength desired and on the desired number of alternating injections. For example, if two alternating injections (one alternating injection comprises one gelling composition and one polymer only solution) are desired, one might choose to inject about one half of the total crosslinking agent required to obtain a desirable gel strength is injected in each of gel injection cycles. Generally, the number of alternating injections is in the range of from about 1 to about 20, preferably about 1 to about 15, most preferably 1 to 10 to obtain satisfactory results. Immediately after the gellable composition is injected, the polymer in aqueous form and in same concentration is continually injected. The amount of the gellable polymer injected is also dependent on the number of alternating injections and the gel strength desired, same as that described for the crosslinking agent.

The gel-alternating-polymer injection process of the present invention can be carried out in the laboratory by monitoring the screen resistance factor.

During Screen Resistance Factor (SRF) measurements, 50.0 g of 500 ppm polymer solution was pumped through one 100-mesh screen to remove large particles (if any), and passing the rest through a stack of four 100-mesh (U.S. standard) screens (0.25″ diameter) for measuring the differential pressure ($\Delta p$) across the screens. A data acquisition system was used to record the time and the weight of the effluent monitored by a balance and the $\Delta p$ across the screens monitored by three Honeywell ST 3000 Smart Transmitters set at 0.5 psi, 10 psi and 50 psi full scale, respectively. An Excel Spreadsheet was used to calculate the flow rate, q, using the recorded weight and time data. The logic employed in Excel was to choose the most sensitive data from the pressure data recorded by the three transducers. Following the polymer injection, 50.0 g of the solution containing microgels was pumped through the same setup while recording the weight and $\Delta p$. SRF value for this microgel solution was then calculated using the following formula at 50.0 g weight of the effluent.

Screen Resistance
Factor$=(q/\Delta p)_{polymer}/(q/\Delta p)_{microgel}$   Eq. 1

After each SRF measurement, the flow was reversed injecting bleach into the screen and allowing the screens to soak for five minutes before injecting distilled water for cleaning. The bleach injection followed by distilled water was repeated at least three times to remove all of the microgels and restoring the screen to its original status. At this point, about 200–300 ml of distilled water was injected in the reverse direction followed by the injection of about 200–300 ml of distilled water at the forward direction during which the $\Delta p$ across the screens was monitored to confirm that the screens are clean. Because of the sensitivity of $\Delta p$ values to the orientation of screens, the same set of screens without dismanteling were used throughout the runs disclosed herein.

The nature of the underground formation treated is not critical to the practice of the present invention. The described gellable composition can be injected into a formation having a temperature range of from about 70° F. to about 300° F. when the polymer used is a gellable copolymer suitable for the brine used at the reservoir temperature or temperatures in the range of from about 70° F. to about 200° F. for partially hydrolyzed polyacrylamide, xanthan gum, CMC, or CMHEC, preferably about 80° F. to about 180° F., and most preferably 80° F. to 170° F. for best results. Any means known to one skilled in the art can be used for injecting the gelling composition and polymer solution.

Examples provided hereinbelow are intended to assist one skilled in the art to further understand the invention and should not be considered limitative.

EXAMPLE I

The purpose of this example is to illustrate the measurement of screen resistance factor (SRF). The test setup used to measure the screen resistance factor (SRF) values consisted of a Gilson peristaltic pump, one 100-mesh screen to remove large particles (if any), four 100-mesh screens where the polymer or the gelling mixture was pumped through, a Sartorius Balance, three Honeywell ST 3000 "Smart Transmitters" (transducers) and a data acquisition system. First, 50.0 g of 500 ppm polymer solution were pumped into the screens while recording the time, weight, and $\Delta p$ (differential pressure) across the four screens. This test was then repeated, injecting 50.0 g of a gelling mixture containing 500 ppm polymer in Tank Battery 57 brine of North Bank Unit, Shidler, Okla. and a proper amount of crosslinker. The data were collected on a LabTech Notebook/XE software purchased from Laboratory Technologies Corporation, Wilmington, Ma. The data which included the time, weight and $\Delta p$ values measured with the three transducers, were collected every one second throughout the test. The data were taken to an Excel Spreadsheet for calculation. The logic employed in Excel chose the most sensitive value of Δp for any flow rate. For the SRF values shown in FIG. 1, the values chosen to be measured were at the point where 50.0 g of effluent (polymer or gelling mixture) passed through the screens. After calculating the flow rate (q in g/second) using the weight and time values at 50.0 g effluents, the Δp values were average at 50.0 g effluent with the values measured 5 seconds before and 5 seconds after reaching the 50.0 g effluent. These values were then used to calculate SRF value using Eq. 1.

FIG. 1 shows a plot of SRF values measured at various concentrations of zirconium with two different crosslinkers used with two different polyacrylamides solutions. As this plot shows, there was a linear relation between the SRF value and the zirconium crosslinker used. This was due to the formation of larger microgels at higher Zr concentrations. The difference in slope of the lines might be related to the activity of a given crosslinker as well as molecular weight of the polymer.

EXAMPLE II

This example illustrates the invention process for the gelation of water-soluble polymer with a complexed zirconium compound in a produced brine. This example and Example III illustrate microgel solutions which produced higher performance using the invention GAP process.

The run was carried out the same as those described in Example I where the brine used was a produced brine obtained from Tank Battery 57 (TB-57) of the North Burbank Unit Oil Field, Shidler, Okla. and the gellable composition (quantity as noted in Table I) was pumped through the screens intermittently with straight polymer solution (quantity also noted in Table I). The produced brine has a total dissolved solids (TDS) of 10 weight % and that the gel-alternating-polymer injection process of the invention monitored by the screen resistance factor as described above was used. For comparison, a standard test which continuously pumped a gellable composition through the screens was also carried out as noted in Table I. The results are shown in Table I.

TABLE I

Comparison of GAP[a] Treatment vs. Standard Gel[b] Treatment for
500 ppm "OFXC-1163" in TB-57 Brine with "MPD-6303" Crosslinker
Aged at 120° F. to Equilibrium[c] Before SRF Measurements

|  | Process | Sequence | Sequence Mass (grams) | Sequence Composition | | Weight of Chemicals Used (mg) | |
| --- | --- | --- | --- | --- | --- | --- | --- |
|  |  |  |  | "OFXC-1163" | "MPD-6303" | "OFXC-1163" | "MPD-6303" |
| One Step | Standard[b] | Constant Crosslinker | 100.00 | 499.28 | 20.10 | 49.9 | 2.0 |
| Step 1 | GAP[a] | gel | 10.22 | 497.74 | 99.79 | 5.1 | 1.0 |
| Step 2 | GAP | polymer | 40.13 | 500.76 | 0.00 | 20.1 | 0.0 |
| Step 3 | GAP | gel | 10.23 | 497.74 | 99.79 | 5.1 | 1.0 |
| Step 4 | GAP | polymer | 39.42 | 500.76 | 0.00 | 19.7 | 0.0 |
|  |  | TOTAL | 100.00 |  | TOTAL | 50.0 | 2.0 |

[a]GAP = gel alternating with polymer.
[b]Standard = straight gel treatment, i.e., single injection process.
[c]When the pressure no longer changed. Generally, it took about 24–48 hours of aging.
[d]"OFXC-1163" is a polyacrylamide with 8% hydrolysis and molecular weight of 14,000,000 to 18,000,000 and was obtained from American Cyanamid.
[e]"MPD-6303" is a zirconium complex obtained from Du Pont Chemicals, Jackson Laboratory, Deepwater, New Jersey.

Figure 2:
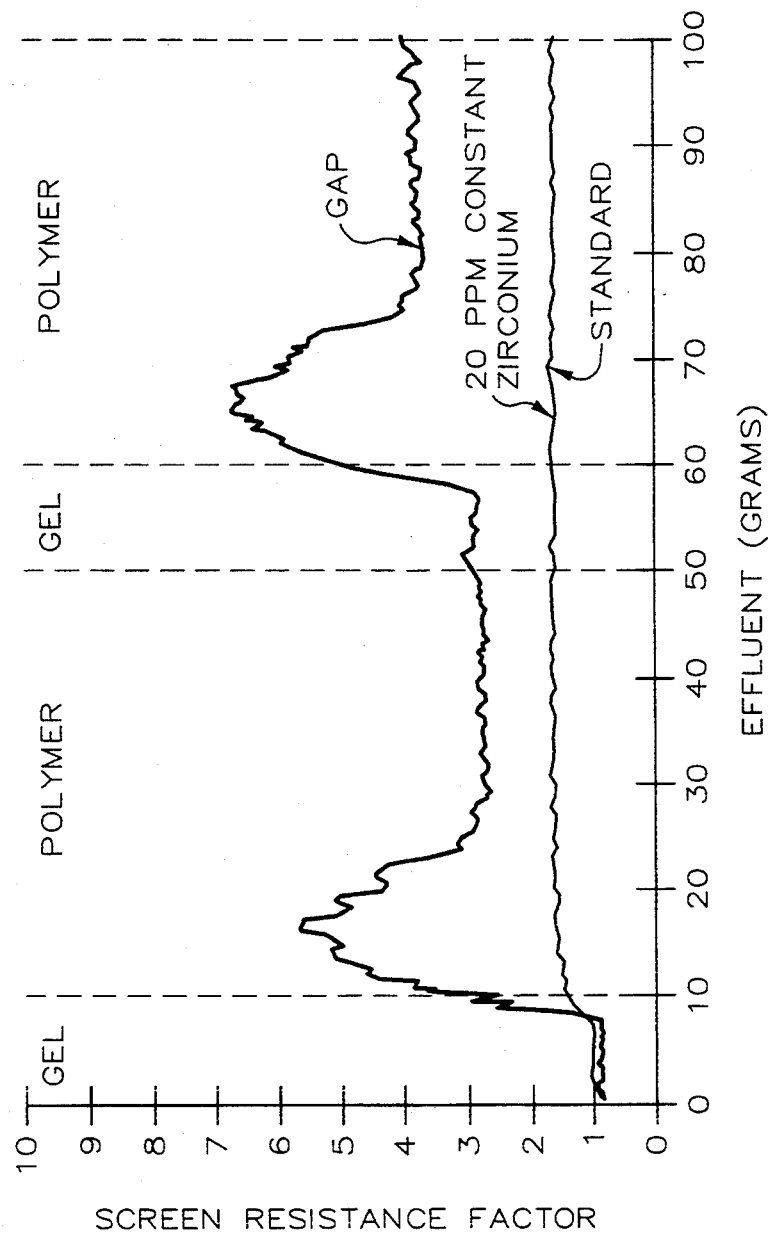
FIG. 2 is a comparison of the screen resistance factor of the invention Gel-Alternating-Polymer process (GAP) to that of a standard (single injection) process. Polyacrylamide "OFXC-1163" was used as polymer and "MPD-6303" was used as crosslinking agent. See Example II for detail. The total area integrated under the GAP curve was 263.2 area units and that under the standard curve (or at 20 ppm constant zirconium X-linker curve, wherein X-linker denotes crosslinking agent or crosslinker) was 59.0. The ratio of GAP area to standard area is 4.46 by integration method, or 4.33 by measuring the weight of the cutup areas under GAP and standard curves.
Figure 3:
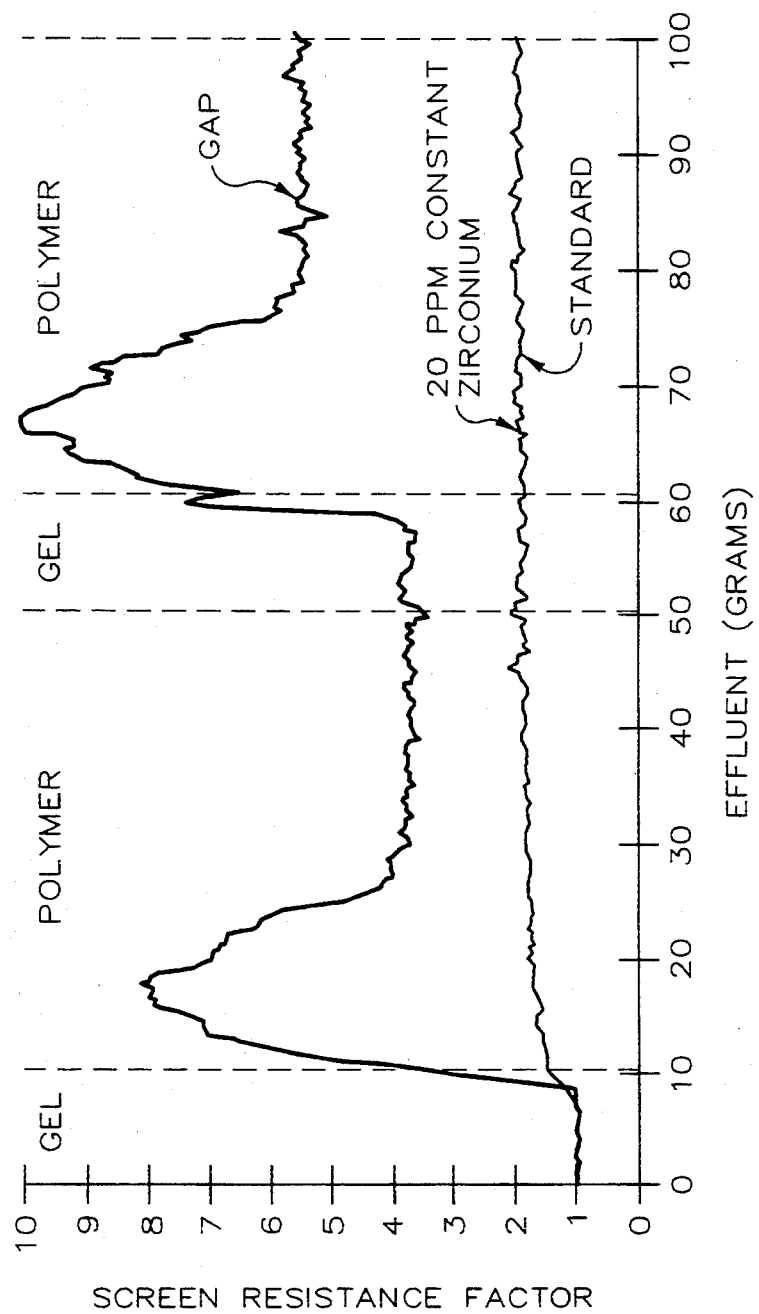
FIG. 3 is a comparison of the screen resistance factor for the invention process (GAP) to that of a standard (single injection) process. Polyacrylamide ("POLYDIA 1041") was used as gellable polymer and "MPD-6303" was used as crosslinking agent. See Example III for details. The total area integrated under the GAP curve was 418.9 area units whereas that under the standard (single injection curve) was 79.7. The ratio of GAP area to standard area was 5.25.

As shown in Table I, for standard test, 100.00 grams of a solution containing 499.28 ppm of polymer and 20.1 ppm of zirconium was injected into a set of four 100-mesh screens resulting a total amount of 49.9 mg polymer and 2.0 mg zirconium injected into the screens in one injection step. This process resulted in a final SRF value of about 1.7. The SRF values in FIG. 2 and FIG. 3 represent the values calculated at each point using Eq. 1 instead of those calculated to 50.0 g point as described in Example I.

In another test, a sequence of (1) gelling mixture, (2) polymer, (3) gelling mixture, and (4) polymer was injected through the same set of screens after the screens had been cleaned as described earlier. This test is identified as GAP in Table I. The total amount of solutions injected added up to 100.00 grams containing 50.0 mg of polymer and 2.0 mg of zirconium (Table I). As FIG. 2 shows, the GAP process (the invention) resulted in a substantial improvement in SRF value (end point SRF=3.9) compared to the standard test (single injection of 100.00 g of solution containing 49.9 mg of polymer and 2.0 mg of zirconium) (end point SRF=1.7). To evaluate the total impact of the invention process, the area under the curve for the invention process and that for the standard (single injection) were calculated. It was found that the total area for the invention process was about 4.3 times that for the standard (single injection) process indicating more than 4 fold increase in gel performance.

EXAMPLE III

This is another example illustrating the invention process for the gelation of polyacrylamide polymer.

The run was carried out the same as that described in Example II except that polyacrylamide "OFXC-1163" in Example II was replaced with another polyacrylamide "POLYDIA 1041" (3–6% hydrolysis; obtained from Nitto Chemical Industry Co., Ltd., Tokyo, Japan). The results are shown in Table II.

TABLE II[a]

Comparison of GAP Treatment vs. Standard Gel Treatment for 500 ppm "POLYDIA 1041[b]" in TB-57 Brine with "MPD-6303" Crosslinker Aged at 120° F. to Equilibrium Before SRF Measurements

|  | Process | Sequence | Sequence Mass (grams) | Sequence Composition "POLYDIA 1041" | "MPD-6303" | Weight of Chemicals Used (mg) "POLYDIA 1041" | "MPD-6303" |
| --- | --- | --- | --- | --- | --- | --- | --- |
|  | Standard | Constant Crosslinker | 100.00 | 503.74 | 19.96 | 50.4 | 2.0 |
| Step 1 | GAP | gel | 10.22 | 511.79 | 97.95 | 5.2 | 1.0 |
| Step 2 | GAP | polymer | 40.13 | 499.94 | 0.00 | 20.1 | 0.0 |
| Step 3 | GAP | gel | 10.23 | 511.79 | 97.95 | 5.2 | 1.0 |
| Step 4 | GAP | polymer | 39.42 | 499.94 | 0.00 | 19.7 | 0.0 |
|  |  | TOTAL | 100.00 |  |  | 50.2 | 2.0 |

[a] See Table I for footnotes.
[b] "POLYDIA 1041" is a polyacrylamide having 3-6% hydrolysis and 18 dL/g inherent viscosity and was obtained from Nitto Chemical Industry Co. Ltd., Tokyo, Japan.

Results similar to those of Table I were obtained for the compositions in Table II. The results were plotted as FIG. 3. FIG. 3 shows that the GAP process (the invention) also resulted in much higher SRF value (end SRF=5.75) compared to the standard (single injection) of 100.00 g of polymer solution containing 50.4 mg of polymer and 2.0 mg of zirconium. The results plotted in FIG. 3 show that the total area integrated under the GAP process is about 5.25 times that under the single injection process. This indicates that the gel strength produced using the invention process was more than 5 times that of the standard (single injection) process even though total amounts of polymer and zirconium were the same.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

What is claimed is:

1. A process comprising adding a crosslinking agent intermittently to a stream of aqueous solution of a gellable polymer, injected into a subterranean formation, wherein said gellable polymer forms a gel in the presence of said crosslinking agent in said subterranean formation.

2. A process according to claim 1 wherein said crosslinking agent is selected from the group consisting of phenol and formaldehyde; resorcinol and formaldehyde; furfuryl alcohol and formaldehyde; phenol and hexamethylenetetramine; p-aminobenzoic acid and hexamethylenetetramine; salicylic acid and hexamethylenetetramine; phenyl salicylate and hexamethylenetetramine; methyl p-hydroxybenzoate and hexamethylenetetramine; phenyl acetate and hexamethylenetetramine; phenyl benzoate and hexamethylenetetramine; phenyl propionate and hexamethylenetetramine; phenyl butyrate and hexamethylenetetramine; aspirin and hexamethylenetetramine; furfuryl alcohol and hexamethylenetetramine; a multivalent cation compound selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, and combinations thereof; and combinations thereof.

3. A process according to claim 2 wherein said crosslinking agent is selected from the group consisting of zirconium lactate, zirconium citrate, tetrakis(triethanolamine)zirconate, zirconium complex of hydroxyethyl glycine, and combinations thereof. tetrakis(triethanolamine)zirconate, zirconium complex of hydroxyethyl.

4. A process according to claim 1 wherein said crosslinking agent further comprises a complexing ligand which delays the rate of gelation.

5. A process according to claim 4 wherein said complexing ligand is selected from the group consisting of hydroxyethyl glycine, lactic acid, ammonium lactate, sodium lactate, potassium lactate, citric acid, ammonium citrate, potassium citrate, sodium citrate, isocitric acid, ammonium isocitrate, potassium isocitrate, sodium isocitrate, malic acid, ammonium malate, potassium malate, sodium malate, tartaric acid, ammonium tartrate, potassium tartrate, sodium tartrate, triethanolamine, malonic acid, ammonium malonate, potassium malonate, sodium malonate, and mixtures thereof.

6. A process according to claim 1 wherein said crosslinking agent is in a produced brine.

7. A process according to claim 1 wherein said polymer is selected from the group consisting of biopolysaccharides, cellulose ethers, acrylamide-containing polymers, polystyrene sulfonate, polyacrylonitrile, lignosulfonates, and combinations of two or more thereof.

8. A process according to claim 7 wherein said polymer is an acrylamide-containing polymer selected from the group consisting of polyacrylamide, partially hydrolyzed polyacrylamide, copolymer of acrylamide and N-vinyl-2-pyrrolidone, copolymer of acrylamide and sodium 2-acrylamido-2-methylpropane sulfonate, terpolymer of acrylamide, N-vinyl-2-pyrrolidone, 2-acrylamido-2-methylpropane sulfonate, and combinations thereof.

9. A process according to claim 8 wherein said polymer is selected from the group consisting of polyacrylamide, partially hydrolyzed polyacrylamide, and combinations thereof.

10. A process according to claim 1 wherein said polymer is in a produced brine.

11. A process comprising the steps of:

(1) injecting into a subterranean formation a gelling composition comprising an aqueous solution of a first gellable polymer and a crosslinking agent; and (2) injecting into said subterranean formation an aqueous solution of a second gellable polymer;

wherein the steps (1) and (2) are repeated for about 1 to 20 times; and said first and second gellable polymers form a gel in the presence of said crosslinking agent, when injected into said subterranean formation.

12. A process according to claim 11 wherein said crosslinking agent is selected from the group consisting of phenol and formaldehyde; resorcinol and formaldehyde; furfuryl alcohol and formaldehyde; phenol and hexamethylenetetramine; p-aminobenzoic acid and hexamethylenetetramine; salicylic acid and hexamethylenetetramine; phenyl salicylate and hexamethylenetetramine; methyl p-hydroxybenzoate and hexamethylenetetramine; phenyl acetate and hexamethylenetetramine; phenyl benzoate and hexamethylenetetramine; phenyl propionate and hexamethylenetetramine; phenyl butyrate and hexamethylenetetramine; aspirin and hexamethylenetetramine; furfuryl alcohol and hexamethylenetetramine; a multivalent cation compound selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, and combinations thereof; and combinations thereof.

13. A process according to claim 11 wherein said crosslinking agent is selected from the group consisting of zirconium lactate, zirconium citrate, tetrakis(triethanolamine)zirconate, zirconium complex of hydroxyethyl glycine, and combinations thereof.

14. A process according to claim 11 wherein said crosslinking agent further comprises a complexing ligand which delays the rate of gelation.

15. A process according to claim 14 wherein said complexing ligand is selected from the group consisting of hydroxyethyl glycine, lactic acid, ammonium lactate, sodium lactate, potassium lactate, citric acid, ammonium citrate, potassium citrate, sodium citrate, isocitric acid, ammonium isocitrate, potassium isocitrate, sodium isocitrate, malic acid, ammonium malate, potassium malate, sodium malate, tartaric acid, ammonium tartrate, potassium tartrate, sodium tartrate, triethanolamine, malonic acid, ammonium malonate, potassium malonate, sodium malonate, and mixtures thereof.

16. A process according to claim 11 wherein said crosslinking agent is in a produced brine.

17. A process according to claim 11 wherein said polymer is selected from the group consisting of biopolysaccharides, cellulose ethers, acrylamide-containing polymers, polystyrene sulfonate, polyacrylonitrile, lignosulfonates, and combinations of two or more thereof.

18. A process according to claim 17 wherein said polymer is an acrylamide-containing polymer selected from the group consisting of polyacrylamide, partially hydrolyzed polyacrylamide, copolymer of acrylamide and N-vinyl-2-pyrrolidone, copolymer of acrylamide and sodium 2-acrylamido-2-methylpropane sulfonate, terpolymer of acrylamide, N-vinyl-2-pyrrolidone, 2-acrylamido-2-methylpropane sulfonate, and combinations thereof.

19. A process according to claim 18 wherein said polymer is selected from the group consisting of polyacrylamide, partially hydrolyzed polyacrylamide, and combinations thereof.

20. A process according to claim 11 wherein said polymer is in a produced brine.

21. A process for altering the permeability of a subterranean formation comprising the steps of:

(1) injecting into said subterranean formation a gelling composition comprising an aqueous solution of a gellable polymer and a crosslinking agent; and (2) injecting an aqueous solution of said gellable polymer into said subterranean formation;

wherein the steps (1) and (2) are repeated in sequence for about 1 to 10 times; said gellable polymer is an acrylamide-containing polymer selected from the group consisting of polyacrylamide, partially hydrolyzed polyacrylamide, copolymer of acrylamide and N-vinyl-2-pyrrolidone, copolymer of acrylamide and sodium 2-acrylamido-2-methylpropane sulfonate, terpolymer of acrylamide, N-vinyl-2-pyrrolidone, 2-acrylamido-2-methylpropane sulfonate, and combinations thereof; said crosslinking agent is selected from the group consisting of phenol and formaldehyde; resorcinol and formaldehyde; furfuryl alcohol and formaldehyde; phenol and hexamethylenetetramine; p-aminobenzoic acid and hexamethylenetetramine; salicylic acid and hexamethylenetetramine; phenyl salicylate and hexamethylenetetramine; methyl p-hydroxybenzoate and hexamethylenetetramine; phenyl acetate and hexamethylenetetramine; phenyl benzoate and hexamethylenetetramine; phenyl propionate and hexamethylenetetramine; phenyl butyrate and hexamethylenetetramine; aspirin and hexamethylenetetramine; furfuryl alcohol and hexamethylenetetramine; a multivalent cation compound selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, and combinations thereof; and combinations thereof; and said gellable polymer forms a gel in the presence of said crosslinking agent, when injected into said subterranean formation.

* * * * *

UNITED STATES PATENT AND TRADEMARK OFFICE
CERTIFICATE OF CORRECTION

PATENT NO. : 5,423,380
DATED : June 13, 1995
INVENTOR(S) : Everett L. Johnston, et al It is certified that error appears in the above-indentified patent and that said Letters Patent is hereby corrected as shown below:

Column 10, lines 29-31, delete the words
"tetrakis(triethanolamine)zirconate, ziconium complex of hydroxyethyl."

Signed and Sealed this

Twenty-ninth Day of August, 1995

Attest:

BRUCE LEHMAN

Attesting Officer        Commissioner of Patents and Trademarks